(12) United States Patent
Kogure

(10) Patent No.: US 7,142,668 B1
(45) Date of Patent: Nov. 28, 2006

(54) APPARATUS AND METHOD FOR GENERATING EXPRESSION DATA FOR FINITE FIELD OPERATION

(75) Inventor: Jun Kogure, Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/503,205

(22) Filed: Feb. 14, 2000

(30) Foreign Application Priority Data

Apr. 9, 1999 (JP) .................................. 11-102920

(51) Int. Cl.
*H04K 1/00* (2006.01)

(52) U.S. Cl. ........................ 380/28; 380/44; 380/45; 380/42; 380/30

(58) Field of Classification Search ............... 380/28, 380/21, 30, 42, 44, 45; 324/73.1; 708/8
See application file for complete search history.

(56) References Cited

U.S. PATENT DOCUMENTS

| 4,687,988 A | * | 8/1987 | Eichelberger et al. ..... 324/73.1 |
| 5,189,633 A | * | 2/1993 | Bonadio ..................... 708/142 |
| 5,272,755 A | | 12/1993 | Miyaji et al. |
| 5,442,707 A | | 8/1995 | Miyaji et al. |
| 5,933,501 A | * | 8/1999 | Leppek ....................... 380/259 |
| 6,868,159 B1 | * | 3/2005 | Leppek ......................... 380/28 |

FOREIGN PATENT DOCUMENTS

| EP | 0 202 768 A2 | 11/1986 |
| EP | 0 503 119 A1 | 9/1992 |
| JP | 5-181418 | 7/1993 |
| JP | 6-295154 | 10/1994 |
| JP | 9-73269 | 3/1997 |
| JP | 11-212458 | 8/1999 |
| JP | 2002-533787 | 10/2002 |
| WO | WO 91/20028 | 12/1991 |
| WO | WO 00/39668 | 7/2000 |

OTHER PUBLICATIONS

Wright, A Random Polynomial Generator, Jul. 14, 1994, pp. 1-9.*
Schneier, Applied Cryptography, 1996, John Wiley & Sons, pp. 584 and 320.*
Shneier, Applied Cryptography, 1996, John Wiley & Sons, Inc., 2nd Edition, p. 174.*
T. Okamoto, et al., "Cryptography, Zero-Knowledge Proof, and Number Theory", Kyoritsushuppan Co., Ltd., Jun. 1, 1995, pp. 130-143 and pp. 167-170.
Y. Yin, "IEEE P1363 Annex A/Editorial Contribution: Standard Specifications for Public Key Cryptography".
Working Draft, "American National Standard X9.62-199X, Public Key Cryptography for the Financial Services Industry: The Elliptic Curve Digital Signature Algorithm (ECDSA)".
European Search Report of Dec. 28, 2004.
Notice of Rejection Grounds mailed on Nov. 29, 2005 for corresponding Japanese Patent Application.

* cited by examiner

*Primary Examiner*—Kim Vu
*Assistant Examiner*—Paula Klimach
(74) *Attorney, Agent, or Firm*—Staas & Halsey LLP

(57) ABSTRACT

If a condition which can be intuitively hit upon, such as the bit length of a prime number or an extension degree is designated, the expression data of a finite field corresponding to the condition can be automatically generated, and a finite field operation can be performed using the expression data.

10 Claims, 15 Drawing Sheets

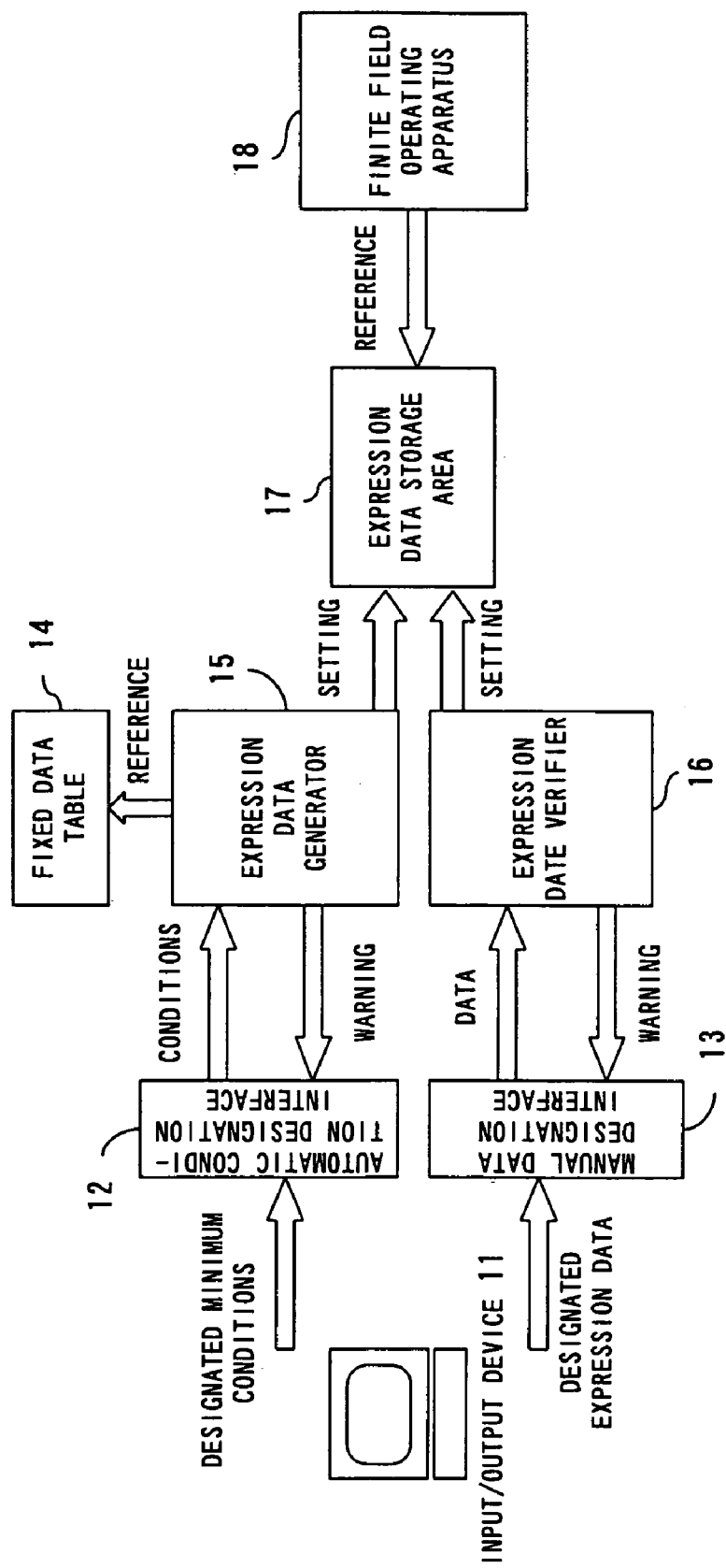
F I G. 4

| BIT LENGTH n | PRIME NUMBER OF n BITS |
|---|---|
| 2 | 3 |
| 3 | 7 |
| 4 | 11 |
| ⋮ | ⋮ |

F I G.   7

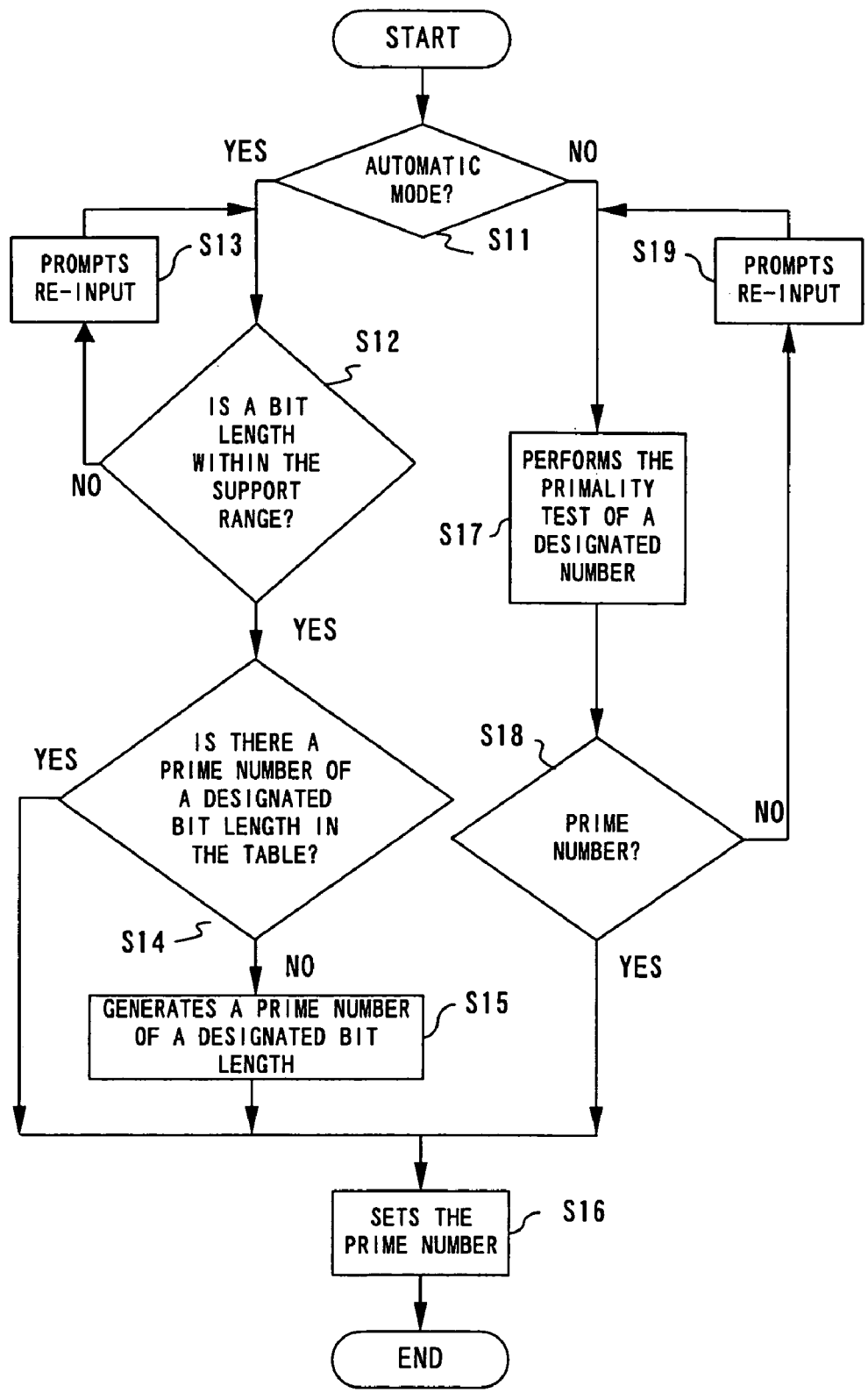
F I G. 8

| EXTENSION DEGREE m | IRREDUCIBLE POLYNOMIAL OF DEGREE m |
|---|---|
| 2 | $x^2+x+1$ |
| 3 | $x^3+x+1$ |
| 4 | $x^4+x+1$ |
| ⋮ | ⋮ |

FIG. 10

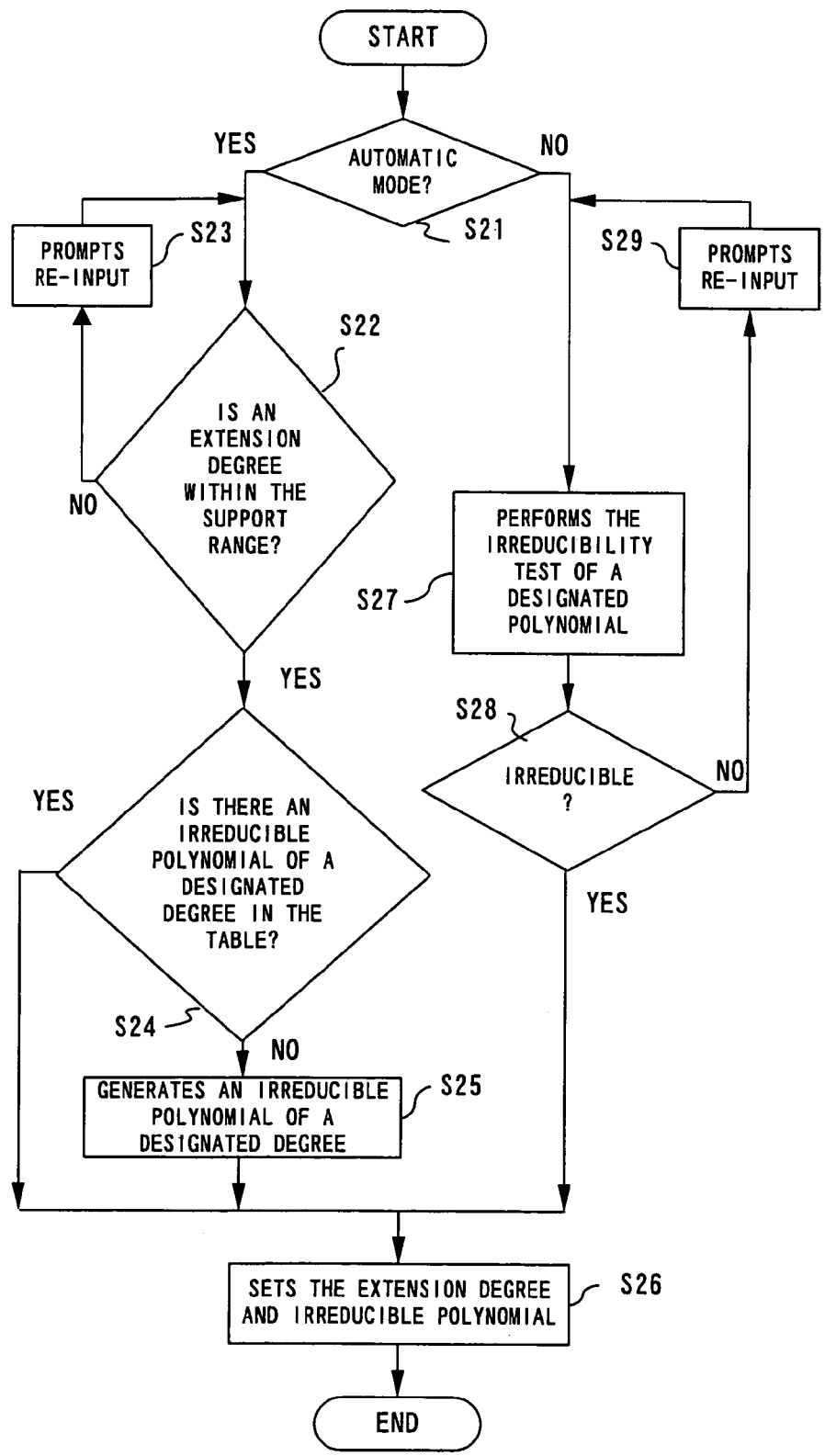
F I G. 1 1

APPARATUS AND METHOD FOR GENERATING EXPRESSION DATA FOR FINITE FIELD OPERATION

BACKGROUND OF THE INVENTION

1. Field of the Invention

The present invention relates to a data generating apparatus for automatically setting the expression data of a finite field when a finite field operation of codes, ciphers, etc., is performed and a method thereof.

2. Description of the Related Art

Along with the recent development of a computer technology and a network technology, situations where a finite field operation is performed in a variety of fields including codes, ciphers, etc., have been increasing. A finite field means a finite aggregate in which four arithmetical operations are defined, and a finite field operation means four operations defined in a finite field.

In particular, in a business utilizing the Internet, such as e-commerce, etc., a cipher technology for ensuring security in an open network is spot-lighted as a very important technology. To realize a cipher technology, a finite field operation is indispensable. However, a finite field of a very large size is often required to ensure the security of data, and the improvement of the operation efficiency is a major and practical objective.

To realize a finite field operation, first, several pieces of expression data are selected and the finite field must be expressed by using the expression data. If it is assumed that a prime number and a positive integer are p and m, respectively, the number of finite field elements becomes $p^m$. This positive integer m is called an extension degree. It is generally known that in order to describe the element of a finite field, a prime number p, an extension degree m and an irreducible polynomial of degree m F(x) must be set as expression data.

In a conventional finite field operating apparatus, a finite field is expressed by using fixed expression data stored in the apparatus in advance or by a user designating all expression data.

However, the conventional finite field expression method has the following problems.

If only fixed expression data are used, a variety of expression data required in a variety of situations of a system for codes, ciphers, etc., cannot be obtained and thereby the expression lacks flexibility. If a user designates all expression data in a very large finite field, the selection of expression data requires a lot of labor. Furthermore, if the user selects inappropriate expression data, the operation speed sometimes decreases and thereby the performance of the system sometimes degrades.

SUMMARY OF THE INVENTION

An object of the present invention is to provide a data generating apparatus for flexibly setting the expression data of a finite field while reducing the user workload as much as possible to realize a highly efficient finite field operation, and a method thereof.

The data generating apparatus of the present invention comprises an input device, a generation device and an expression data storage device. The input device inputs conditions for designating a finite field. The generation device automatically generates the expression data of the finite field based on the inputted conditions, and the expression data storage device stores the generated expression data.

The expression data stored in the expression data storage device are supplied to an apparatus for performing a finite field operation, and a finite field operation is performed using the expression data.

BRIEF DESCRIPTIONS OF THE DRAWINGS

FIG. 4 shows the configuration of the first data generating apparatus.

Figure 7:
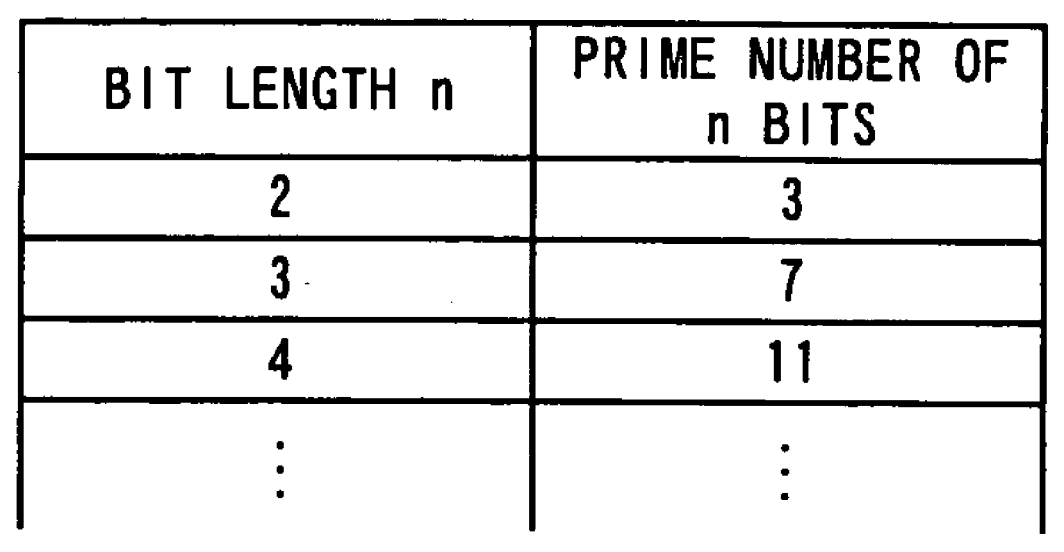

FIG. 7 shows an example of a prime number table.

FIG. 8 is a flowchart showing the second data generation process.

FIG. 10 shows an example of an irreducible polynomial table.

FIG. 11 is a flowchart showing the third data generation process.

DESCRIPTION OF THE PREFERRED EMBODIMENTS

The details of the preferred embodiments of the present invention are described below with reference to the drawings.

Figure 1:
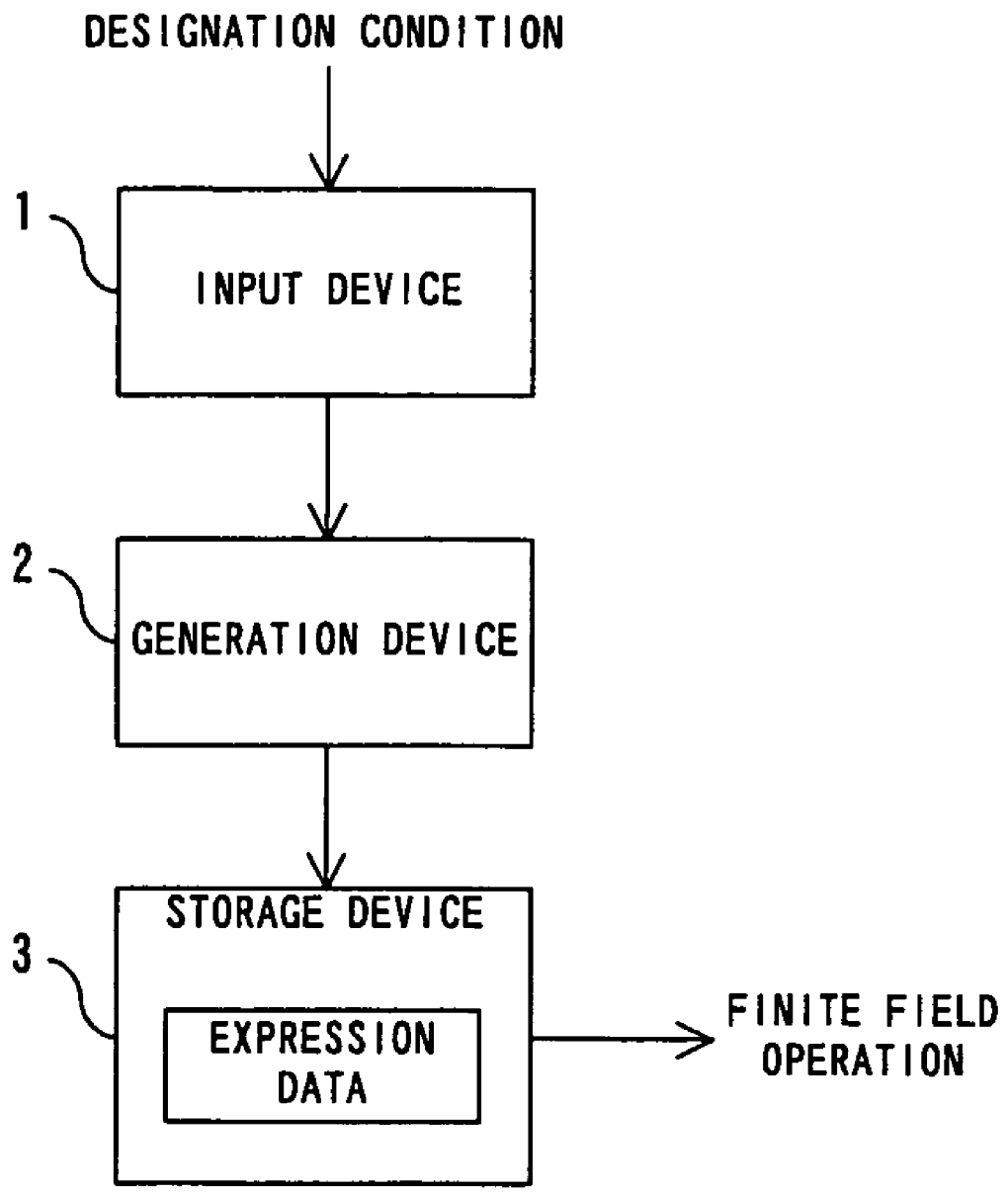
FIG. 1 shows the basic elements of the data generating apparatus of the present invention.

FIG. 1 shows the basic elements of the data generating apparatus of the present invention. The data generating apparatus shown in FIG. 1 comprises an input device 1, a generation device 2 and an expression data storage device. The input device 1 inputs conditions for designating a finite field. The generation device 2 automatically generates the expression data of the finite field based on the inputted conditions, and the expression data storage device 3 stores the generated expression data.

The generation device 2 automatically generates the corresponding expression data of a finite field based on the designation conditions inputted by the input device and stores the generated expression data in the expression data storage device 3. The stored expression data are supplied to an apparatus for performing a finite field operation, and a finite field operation is performed using the expression data.

A user can input the conditions of a desired finite field via the input device 1. At this time, only if the user designates the minimum conditions which can be intuitively hit upon, such as the bit length of a prime number p, extension degree m, etc., the generation device 2 automatically generates expression data which cannot be intuitively hit upon, such as a prime number p, irreducible polynomial of degree m, F(x), etc.

Therefore, the user workload in selecting the expression data of a finite field can be reduced, and the expression data can be flexibly set within the generation range of the generation device 2. Furthermore, if appropriate conditions are designated, expression data which can realize a highly efficient finite field operation can be generated. Therefore, the point of the present invention is to automatically generate the expression data of a finite field based on designated conditions.

For example, the input device 1 shown in FIG. 1 corresponds to the input/output device 11 and automatic condition designation interface 12 shown in FIG. 4, which is described later, and the generation device 2 shown in FIG. 1 corresponds to the expression data generator 15 shown in FIG. 4. The expression data storage device 3 shown in FIG. 3 corresponds to the expression data storage area 17 shown in FIG. 4.

Next, examples of a finite field operation used in a cipher technology are described with reference to FIGS. 2 and 3.

Figure 2:
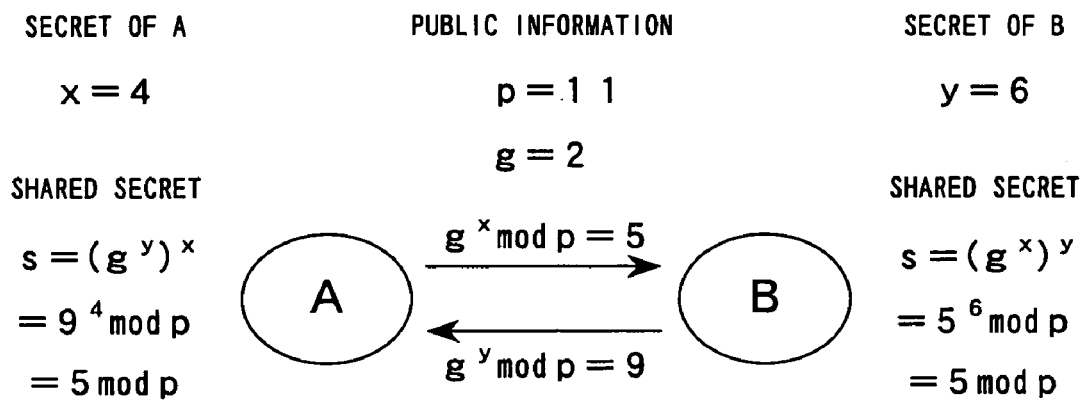
FIG. 2 shows the exchange of the first secret information.

FIG. 2 shows an example of the well-known Diffie-Hellman key exchange. For example, if data communications are performed between users A and B using a secret key cipher, first, a secret key must be shared by users A and B. At this time, Diffie-Hellman key exchange is used to transmit/receive secret information on a network and information is safe from being read by third parties.

If a finite field of the number of elements $p^m$, which is expressed using a prime number p, and an extension degree m, is described as $GF(p^m)$, the finite field used in FIG. 2 is described as $GF(11)$ (m=1). A finite field of m=1 is also called a prime field.

It is assumed here that the facts p=11 and g=2 are made public, and the secret information of user A is x=4, the secret information of user B is y=6, the secret information to be shared is $s=g^{xy}$ mod $p=2^{24}$ mod 11=5. mod p represents a remainder operation using p as the modulus, and $g^{xy}$ mod p represents a finite field operation in GF(11).

At this time, user A transmits $g^x$ mod $p=2^4$ mod 11=5 to user B, and user B transmits $g^y$ mod $p=2^6$ mod 11=9 to user A. Then, user A calculates shared secret information s using $g^y$ mod p=9 received from user B and according to the following equation.

$$s=(g^y)^x=9^4=5 \pmod{P} \qquad (1)$$

User B calculates shared secret information s using $g^x$ mod p=5 received from user A and according to the following equation.

$$s=(g^x)^y=5^6=5 \pmod{p} \qquad (2)$$

Although in this example, p=11 is assumed for convenience, a very large value may actually be used for p. If p is sufficiently large, it becomes very difficult to calculate x and y using $g^x$ mod p and $g^y$ mod p, and it is virtually impossible for a third party to read secret information s, for example, even if a third party obtains the information. In this way, users A and B can share secret information s safely and can exchange enciphered communications using this information as a secret key.

Figure 3:
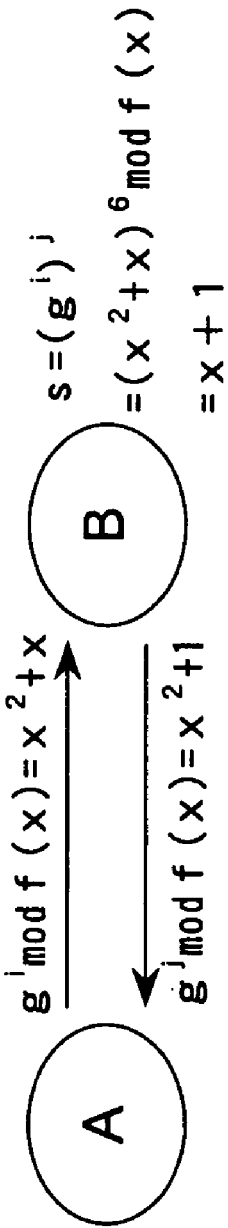
FIG. 3 shows the exchange of the second secret information.

FIG. 3 shows the case where a finite field $GF(2^3)$ which is expressed using an irreducible polynomial of degree three using the element (0 or 1) of a finite field GF(2)={0,1} as the coefficient, is used. In this case, $GF(2^3)$ has $2^3$ polynomials of degree two or less which consist of a term using the element of GF(2) as the coefficient, as the element.

It is assumed here that p=2, an irreducible polynomial of degree three $f(x)=x^3+x+1$ and g=x mod f(x) are made public, the secret information of user A is i=4, the secret information of user B is j=6 and the secret information to be shared is $s=g^{ij}$ mod f(x). mod f(x) represents the remainder operation of a polynomial using f(x) as the modulus, and $g^{ij}$ mod f(x) represents an example of a finite field operation in $GF(2^3)$.

At this time, user A transmits $g^i$ mod $f(x)=x^4$ mod $(x^3+x+1)=x^2+x$ to user B, and user B transmits $g^j$ mod $f(x)=x^6$ mod $(x^3+x+1)=x^2+1$ to user A. Then, user A calculates shared secret information s according to the following equation using $g^j$ mod $f(x)=x^2+1$ received from user B.

$$s=(g^j)^i=(x^2+1)^4=x+1 \pmod{f(x)} \qquad (3)$$

User B calculates shared secret information s according to the following equation using $g^i$ mod $f(x)=x^2+x$ received from user A.

$$s=(g^i)^j=(x^2+x)^6=x+1 \pmod{f(x)} \qquad (4)$$

Although in this example, m=3 is assumed for convenience, a very large value may actually be used. If m is sufficiently large, it becomes very difficult to calculate i and j using $g^i$ mod f(x) and $g^i$ mod f(x), and it is virtually impossible for a third party to read secret information s, for example, even if a third party obtains the information. In this way, users A and B can share secret information s safely and can exchange enciphered communications using this information as a secret key.

As described above, in order to express a prime field GF(p), a prime number p must be designated, and in order to express a finite field $GF(2^m)$, an extension degree m and an irreducible polynomial of degree m must be designated. However, if a very large number is used for p or m, it is difficult for a user to explicitly designate a prime number p or an irreducible polynomial of degree m.

The data generating apparatus in this preffered embodiment automatically generates expression data, such as a prime number p, an irreducible polynomial of degree m, etc., only if a user designates the minimum conditions which can be intuitively hit upon A user load designating expression data is greatly reduced.

At this time, a finite field operation can be realized at higher speed by, if possible, selecting expression data suitable for high-speed operation. Furthermore, flexibility which allows coping with a variety of situations can be realized by providing an interface by which a user can designate all expression data.

FIG. 4 shows the basic configuration of such a data generating apparatus. The data generating apparatus shown in FIG. 4 comprises an input/output device 11, an automatic condition designation interface 12, a manual data designation interface 13, a fixed data table 14, an expression data generator 15, an expression data verifier 16 and an expression data storage area 17, and generates the expression data of a finite field used by a finite field operation device 18.

A user inputs necessary instructions to the automatic condition designation interface 12 or manual data designation interface 13 via the input/output device 11. The automatic condition designation interface 12 is used when a user designates the minimum conditions for generating expression data. The manual data designation interface 13 is used when a user designates an arbitrary parameter of expression data on the spot.

The fixed data table 14 stores suitable predetermined expression data, and the expression data generator 15 determines the expression data finally used, according to the designation of the automatic condition designation interface 12. The expression data verifier 16 verifies that expression data designated by the manual data designation interface 13 is suitable for a finite field operation.

The expression data storage area 17 stores expression data used at the time of actual operation, and the finite field operation device 18 performs a finite field operation with reference to the expression data in the expression data storage area 17.

Figure 5:
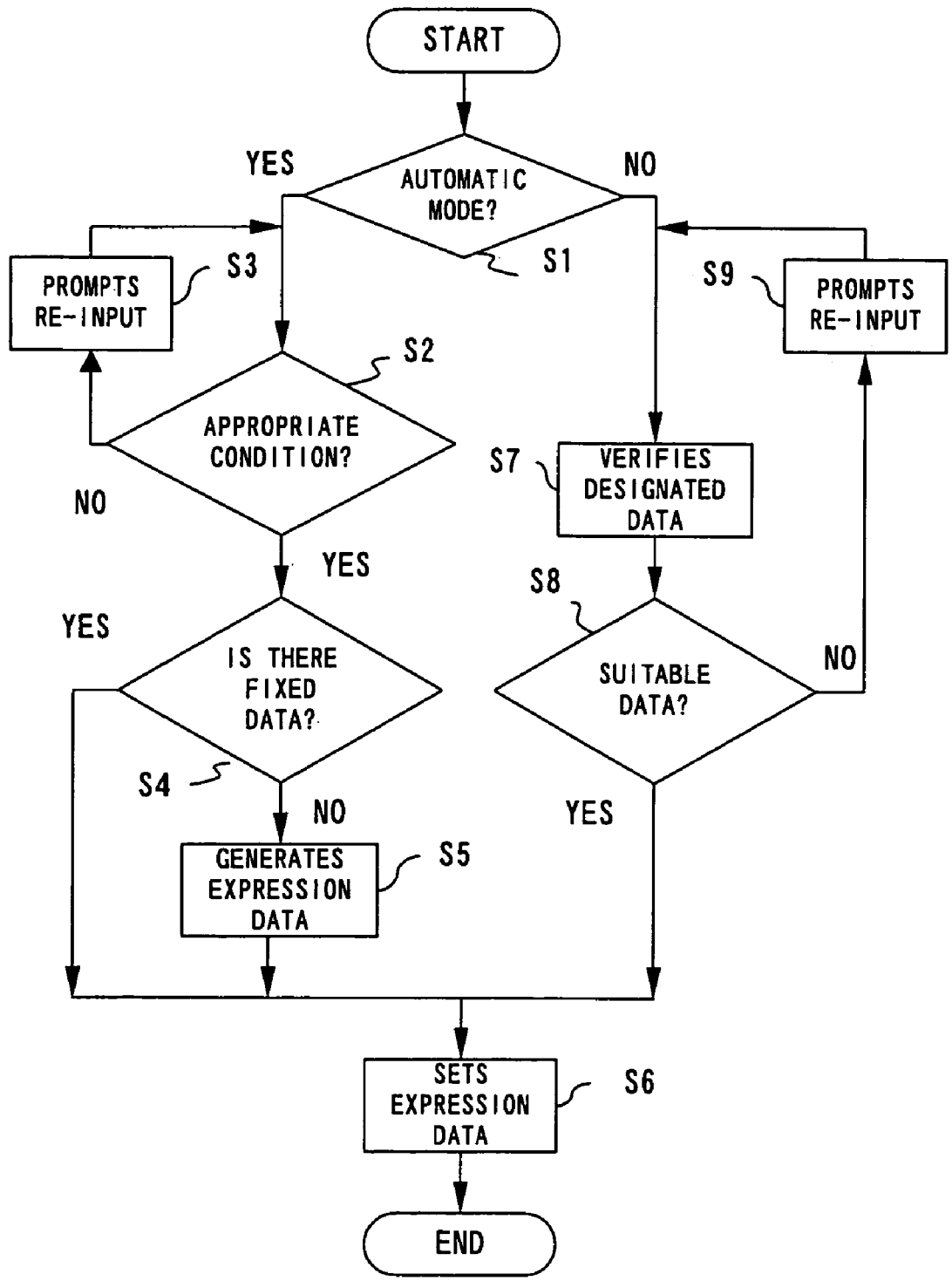
FIG. 5 is a flowchart showing the first data generation process.

FIG. 5 is a flowchart showing the process of the data generating apparatus shown in FIG. 4. A user can select either an automatic mode or a manual mode when designating conditions for selecting expression data, and the data generating apparatus checks which mode is selected by the automatic condition designation interface 12 or manual data designation interface 13 (step S1). In the automatic mode, it is sufficient if a user only designates the minimum conditions. In the manual mode, a user must designate all the parameters of expression data.

If the automatic mode is selected, the expression data generator 15 first checks whether the designated conditions are appropriate (right) (step S2). If the conditions are not appropriate, the expression data generator 15 issues a warning via the automatic condition designation interface 12, requests the re-input of new conditions (step S3) and repeats the processes in step S2 and after.

If the appropriate conditions are inputted, the expression data generator 15 retrieves data from the fixed data table 14, and checks whether there are expression data which satisfy the designated conditions (step S4). If there are such expression data in the fixed data table 14, the expression data generator 15 sets the parameter in the expression data storage area 17 (step S6) and terminates the process. If there are no such expression data, the expression data generator 15 generates expression data based on the designated conditions (step S5), sets the expression data in the expression data storage area 17 (step S6) and terminates the process.

The expression data stored in advance in the fixed data table 17 are, for example, selected to realize a high-speed finite field operation, and the expression data generation logic of the expression data generator 15 is, for example, used to generate expression data for realizing a high-speed finite field operation.

If in step S1, the manual mode is selected, the expression data verifier 16 verifies that the designated expression data are correct (step S7) and checks whether the expression data are suitable for a finite field operation (step S8).

If the expression data are suitable, the expression data are set in the expression data storage area 17, and the process is terminated. If the designated expression data are not suitable, a warning is issued via the manual data designation interface 13, the user is urged to designate suitable expression data again (step S9) and the processes in step S7 and after are repeated.

If the expression data are set in the expression data storage area 17, the finite field operation apparatus 18 performs a finite field operation based on the value. If the automatic mode is selected, the operation efficiency is improved since expression data for realizing a high-speed finite field operation is automatically set.

Next, the preferred embodiments of a variety of data generating apparatuses with the configuration shown in FIG. 4 are described with reference to FIGS. 6 through 12.

Figure 6:
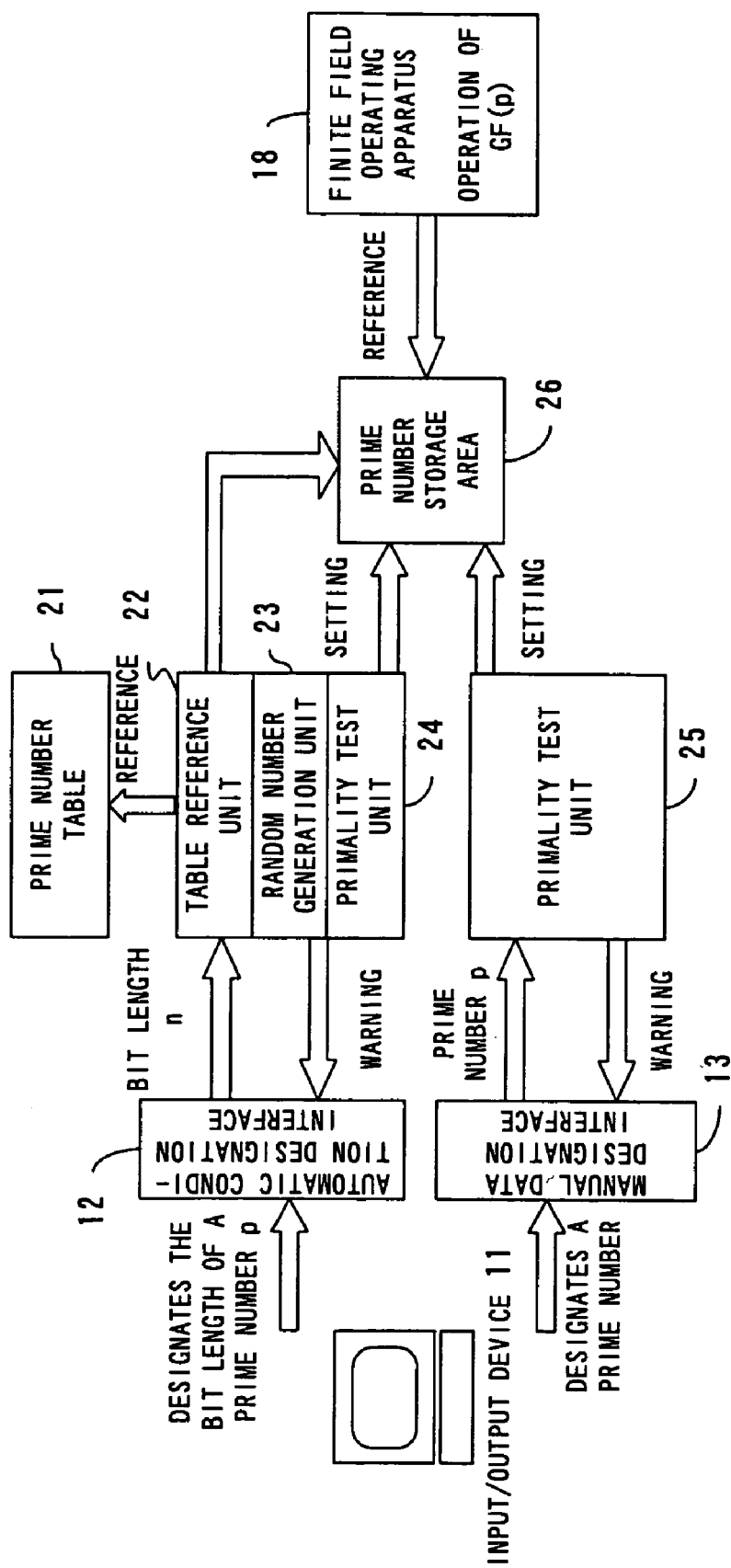
FIG. 6 shows the configuration of the second data generating apparatus.

FIG. 6 shows the configuration of a data generating apparatus for generating the expression data of a prime field GF(p) according to the conditions of a prime number p. For the expression data of a prime field GF(p), a prime number p can be set. This number p can also be called a "characteristic".

The data generating apparatus shown in FIG. 6 comprises an input/output device 11, an automatic condition designation interface 12, a manual data designation interface 13, a prime number table 21, a table reference unit 22, a random number generation unit 23, a pair of primality tests 24 and 25 and a prime number storage area 26, and generates the expression data of a prime field used by the finite field operation apparatus 18.

The prime number table 21 corresponds to the fixed data table shown in FIG. 4, and stores the correspondence between a predetermined prime number and the bit length of the binary code. For example, in the prime number table shown in FIG. 7, prime numbers 3, 7, 11, . . . , corresponding to n=2, 3, 4, . . . , are sequentially stored.

The table reference unit 22, random number generation unit 23 and primality test unit 24 correspond to the expression data generator 15 shown in FIG. 4. The table reference unit 22 references the prime number table 21 using a given bit length n as a key, and acquires a corresponding prime number. If there is no prime number corresponding to the given bit length n in the prime number table 21, the random number generation unit 23 generates a random number of bit length n, and the primality test unit 24 judges whether the random number is a prime number.

The primality test unit 25 corresponds to the expression data verifier 16 shown in FIG. 4, and judges whether a prime number p designated by a user is a true prime number. The prime number storage area 26 corresponds to the expression data storage area 17, and stores the given prime number p as expression data.

FIG. 8 is a flowchart showing the process of the data generating apparatus shown in FIG. 6. First, the data generating apparatus checks which mode is selected, automatic or manual (step S11). In the automatic mode, a user inputs only the bit length of a prime number (bit size of a prime field) via the automatic condition designation interface 12. In the manual mode, a user selects a specific number p on the spot and inputs the prime number p via the manual data designation interface 13.

If an automatic mode is selected, the table reference unit 22 checks whether the designated bit length n is within the support range (step S12). If the designated bit length n is out of the range, a warning is issued via the automatic condition designation interface 12, the re-input of a bit length (step S13) is requested and the processes in steps S12 and after are repeated.

If a bit length within the support range is inputted, data are retrieved from the prime number table 21 and it is checked whether there is a prime number corresponding to the bit length there (step S14). If there is such a prime number in the prime number table 21, the prime number is set in the prime number storage area 26 as a prime number p (step S16) and the process is terminated.

If there is no such prime number, the random number generation unit 23 generates a random number of a designated bit length n, and the primality test unit 24 judges whether the generated random number is a prime number (step S15). Then, the primality test unit 24 adopts the random number judged as a prime number as expression data, sets the random number in the prime number storage area 26 as a prime number p (step S16) and terminates the process.

As an algorithm for the priority test using the primality test unit 24, for example, the algorithms which are specified in the following references are used.

Reference 1: Tatsuaki Okamoto and Kazuo Ota, "Cipher/Zero Knowledge Proof/Number Theory", supervised by the Institute of Information Processing (Kyoritsu Press, 1995) pp. 130–143

Reference 2: IEEE P1363 Annex A Editorial Contribution, "Standard Specifications For Public Key Cryptography", pp. 78–81 (1998)

If in step S11, a manual mode is selected, the primality test unit 25 performs the primality test of the designated number p in the same way as in the primality test unit 24 (step S17) and checks whether the designated number p is a true prime number (step S18).

If the designated number p is a prime number, the designated number p is adopted as expression data, the expression data are set in the prime number storage area 26 (step S16) and the process is terminated. If the designated number p is not a prime number, a warning is issued via the manual data designation interface 13, a user is again urged to input a correct prime number (step S19) and the processes in steps S17 and after are repeated.

If a prime number p is set in the prime number storage area 26, the finite field operation apparatus 18 performs a finite operation in a prime field GF(p) based on the value. According to such a configuration, a prime number p can be generated only if a user designates the bit length. Therefore, a user load in designating a prime number p can be reduced. Since the user can also designate a prime number p directly, if required, flexible operability can be realized.

Figure 9:
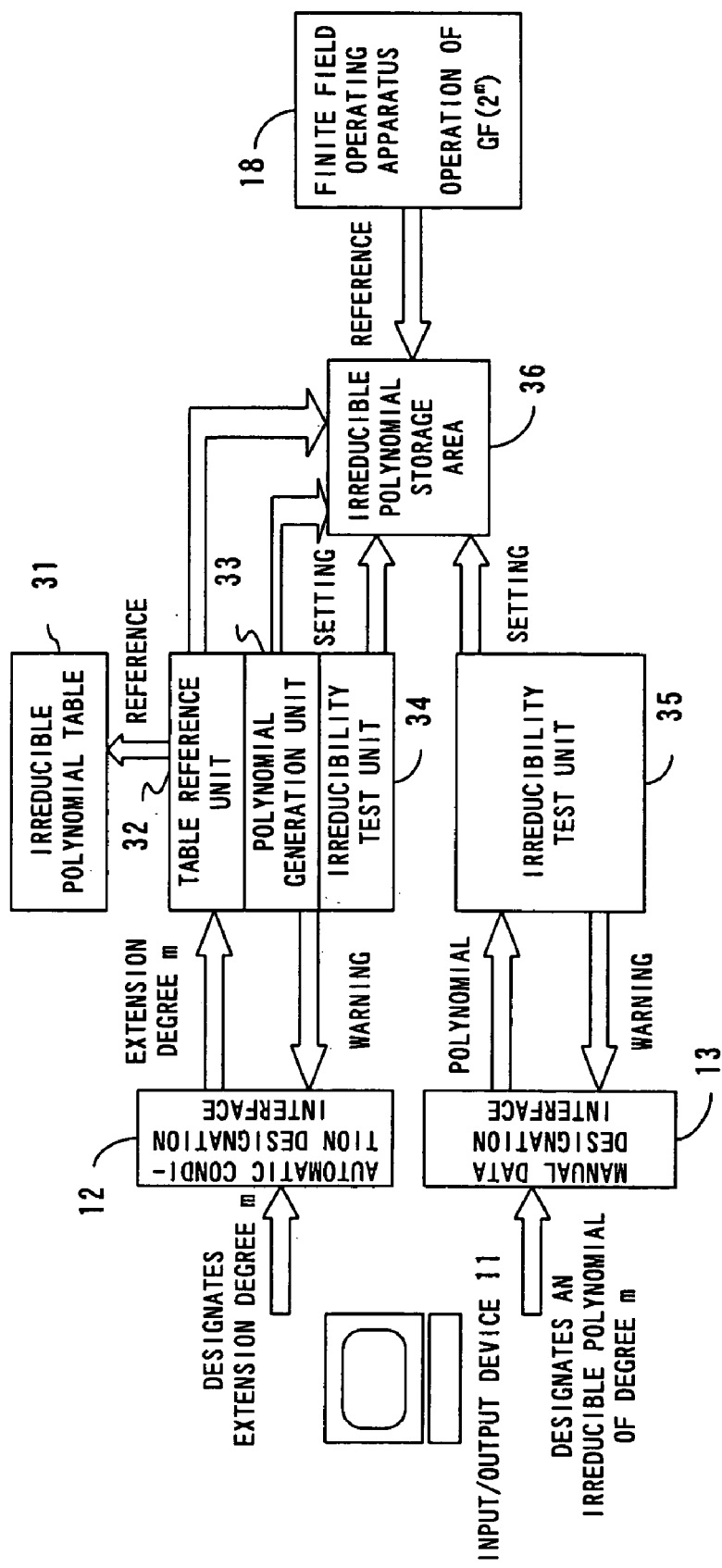
FIG. 9 shows the configuration of the third data generating apparatus.

FIG. 9 shows the configuration of a data generating apparatus for generating the expression data of a finite field $GF(2^m)$ based on an extension degree m. Since in the case of a finite field $GF(2^m)$, a prime number is determined to be 2, it is sufficient to set an extension degree m and an irreducible polynomial of degree m, F(x) as other expression data. A polynomial of degree m can be expressed, for example, using an aggregate of the coefficients (0 or 1) of terms $x^k$ (k=0, 1, . . . , m).

The data generating apparatus shown in FIG. 9 comprises an input/output apparatus 11, an automatic condition designation interface 12, a manual data designation interface 13, an irreducible polynomial table 31, a table reference unit 32, a polynomial generation unit 33, irreducibility test units 34 and 35 and an irreducible polynomial storage area 36, and generates the expression data of a finite field used by the finite field operation apparatus 18.

The irreducible polynomial table 31 corresponds to the fixed data table 14 shown in FIG. 4, and stores the correspondence between a predetermined extension degree m and an irreducible polynomial of degree m, F(x). For example, $x^2+x+1$, $x^3+x+1$, $x^4+x+1$, . . . , are stored as irreducible polynomials corresponding to m=2, 3, 4, . . . , respectively, in the irreducible polynomial shown in FIG. 10.

The table reference unit 32, polynomial generation unit 33 and irreducibility test unit 34 correspond to the expression data generator 15 shown in FIG. 4. The table reference unit 32 references the irreducible polynomial table 31 using a given extension degree m as a key, and acquires a corresponding irreducible polynomial. If there is no irreducible polynomial corresponding to the given extension degree m in the irreducible polynomial table 31, the polynomial generation unit 33 generates a polynomial of degree m, and the irreducibility test unit 34 judges whether the polynomial is irreducible.

The irreducibility test unit 35 corresponds to the expression data verifier 16 shown in FIG. 4, and judges whether the irreducible polynomial of degree m designated by a user is truly irreducible. The irreducible polynomial storage area 36 corresponds to the expression data storage area 17 shown in FIG. 4, and stores the extension degree m and irreducible polynomial of degree m, F(x) as expression data.

FIG. 11 is a flowchart showing the process of the data generating apparatus shown in FIG. 9. First, the data generating apparatus checks which mode is selected, automatic or manual (step S21). In an automatic mode, a user inputs only an extension degree m via the automatic condition designation interface 12. In a manual mode, a user selects a specific irreducible polynomial of degree m F(x) on the spot and inputs the irreducible polynomial as well as the extension degree m via the manual data designation interface 13.

If an automatic mode is selected, the table reference unit 32 checks whether the designated extension degree m is within the support range (step S22). If the designated extension degree is out of the support range, the table reference unit 32 issues a warning via the automatic condition designation interface 12, requests the re-input of an extension degree m (step S23) and repeats the processes in steps S22 and after.

If an extension degree m within the support range is inputted, data are retrieved from the irreducible polynomial table 31 and it is checked whether there is an irreducible polynomial corresponding to the extension degree m there (step S24). If there is such an irreducible polynomial in the irreducible polynomial table 31, the irreducible polynomial is determined as the irreducible polynomial F(x), the irreducible polynomial F(x) as well as the extension degree m are set in the irreducible polynomial storage area 36 (step S26) and the process is terminated.

If there is no such irreducible polynomial, the polynomial generation unit 33 generates a polynomial of degree m, and the irreducibility test unit 34 judges whether the generated polynomial is irreducible (step S25). Then, the irreducibility test unit 34 adopts the polynomial which has been judged to be irreducible, as the irreducible polynomial F(x), sets the irreducible polynomial as well as the extension degree m in the irreducible polynomial storage area 36 (step S26) and terminates the process.

If in step S21, a manual mode is set, the irreducibility test unit 35 performs the irreducibility test of the designated polynomial F(x) in the same way as in the irreducibility test unit 34 (step S27) and checks whether the designated polynomial F(x) is truly irreducible (step S28).

If the designated polynomial F(x) is irreducible, the irreducibility test unit 35 adopts the designated polynomial F(x) as expression data, sets the designated polynomial F(x) as well as the extension degree m in the irreducible polynomial storage area 36 (step S26) and terminates the process. If the designated polynomial F(x) is not irreducible, a warning is issued via the manual data designation interface 13, a user is urged to again input a correct irreducible polynomial (step S29) and the processes in steps S27 and after are repeated.

Figure 12:
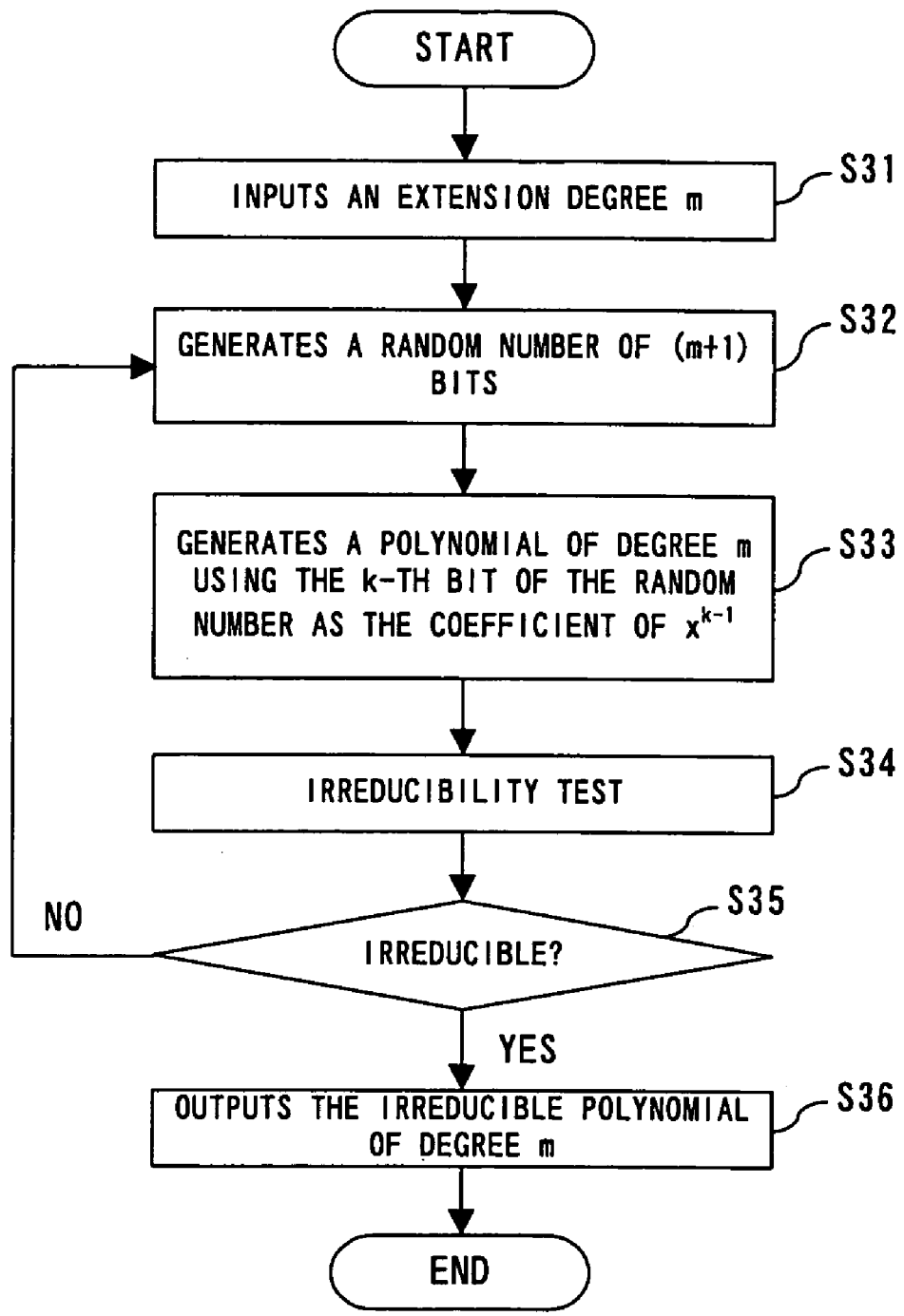
FIG. 12 is a flowchart showing an irreducible polynomial generation process.

FIG. 12 is a flowchart showing the irreducible polynomial generation process in step S25 shown in FIG. 11. First, the table reference unit 32 inputs an extension degree m to the polynomial generation unit 33 (step S31), and then the polynomial generation unit 33 generates a random number (binary code) of (m+1) bits (step S32).

Then, the polynomial generation unit 33 generates a polynomial of degree m using the element of a finite field GF(2)={0, 1} as the coefficient (step S33). In this example, the k-th bit value (0 or 1) of the generated random number is designated as the coefficient of each of terms $x^{k-1}$ in each of the cases of k=1, 2, . . . , m+1, and a polynomial of degree m consisting of those terms is generated.

Then, the irreducibility test unit 34 performs the irreducibility test of the generated polynomial (step S34), and checks whether the generated polynomial is irreducible (step S35). For an algorithm for the irreducibility test, for example, an algorithm specified on page 30 of the above-described reference 2 is used. If the generated polynomial is not irreducible, the processes in steps S32 and after are repeated. If an irreducible polynomial is acquired, the polynomial is outputted to the irreducible polynomial storage area 36 (step S36) and the process is terminated.

If, according to the process shown in FIG. 11, an extension degree m and an irreducible polynomial F(x) are set in the irreducible polynomial storage area 36, the finite field operation apparatus 18 performs a finite field operation in a finite field $GF(2^m)$ based on the data. According to such a configuration, an irreducible polynomial of degree m F(x) is automatically generated only if a user designates an extension degree m. Therefore, a user load in designating an irreducible polynomial F(x) is reduced. The user can also designate an irreducible polynomial F(x) directly, if required, and thereby flexible operability can be realized.

A method using an optimal normal basis is widely known as one method for speeding up operations in a finite field $GF(2^m)$ (see reference 1, pp. 167–170/reference 2, pp. 19–24). Generally, a finite field $GF(2^m)$ can be expressed using a normal basis as a generation source. In particular, if expression data based on an optimal normal basis is used, power as well as multiplication can be rapidly sped up.

For this reason, the data generating apparatus is provided with an option to generate expression data using an optimal normal basis. However, there is not an optimal normal basis in every extension degree and it is necessary to designate suitable extension degree m in order to use an optimal normal basis. For example, out of extension degrees $160 \leq m \leq 2000$ which are used for a cipher, extension degrees in which there is an optimal normal basis are listed in the following reference.

Reference 3: American National Standard, x9.62-199x, Public Key Cryptography For The Financial Services Industry, "The Elliptic Curve Digital Signature Algorithm", pp. 41, Working Draft.

A user can designate whether to use an optimal normal basis, as an option, via the automatic condition designation interface 12 or manual data designation interface 13. In this case, information indicating whether there is an optimal normal basis is attached to each extension degree in the irreducible polynomial table 31 and if there is an optimal normal basis there, information about an irreducible polynomial for an optimal normal basis is attached. An irreducible polynomial for an optimal normal basis means a specific irreducible polynomial required to express a finite field using an optimal normal basis.

Figure 13:
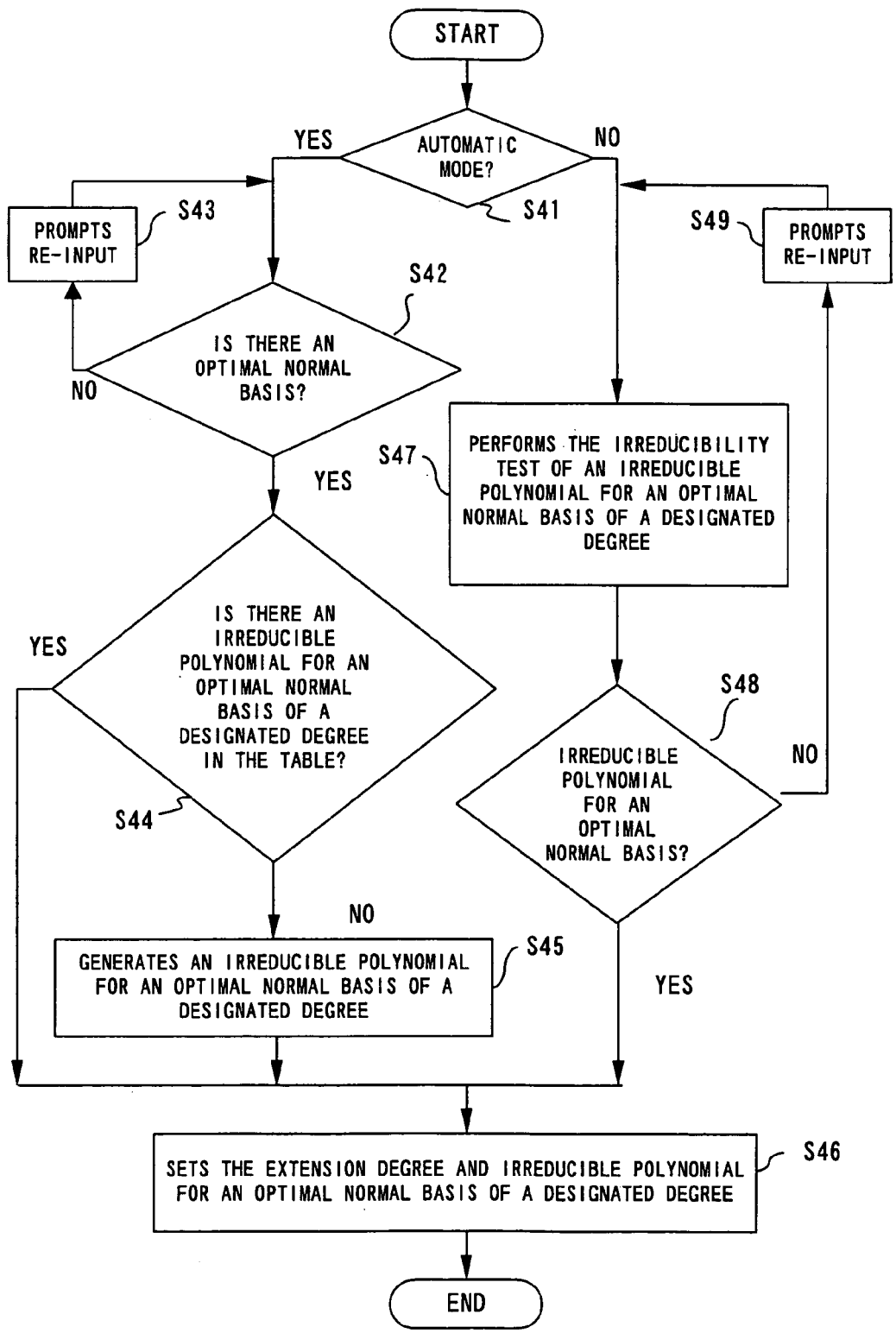
FIG. 13 is a flowchart showing the fourth data generation process.

FIG. 13 is a flowchart showing the process of such a data generating apparatus. First, the data generating apparatus checks which mode is selected, automatic or manual (step S41). In an automatic mode, a user inputs an extension degree m and an instruction to use an optimal normal basis via the automatic condition designation interface 12. In a manual mode, a user selects a specific irreducible polynomial for an optimal normal basis of degree m F(x) on the spot and inputs the specific irreducible polynomial for an optimal normal basis of degree m F(x) as well as the extension degree m via the manual data designation interface 13.

If an automatic mode is selected, the table reference unit 32 references the irreducible polynomial table 31 and checks whether there is the optimal normal basis of the designated extension degree m (step S42). Then, if there is no optimal normal basis of degree m or the extension degree m is out of the support range, a warning is issued via the automatic condition designation interface 12, the re-input of an extension degree m is requested (step S43) and the processes in steps S42 and after are repeated.

If an extension degree m with an optimal normal basis is inputted, it is checked whether there is an irreducible polynomial for an optimal normal basis in the irreducible polynomial table 31 (step S44). If there is such an irreducible polynomial in the irreducible polynomial table 31, the irreducible polynomial is set as an irreducible polynomial for an optimal normal basis F(x), the extension degree is set in the irreducible polynomial storage area 36 (step S46) and the process is terminated.

If there is no such irreducible polynomial, the polynomial generation unit 33 generates an irreducible polynomial for an optimal normal basis of degree m (step S45). Then, the polynomial generation unit 33 sets the irreducible polynomial for an optimal normal basis of degree m as the irreducible polynomial for an optimal normal basis of degree m F(x) as well as the extension degree m in the irreducible polynomial storage area 36 (step S46) and terminates the process. For a generation algorithm for generating an irreducible polynomial for an optimal normal basis, for example, an algorithm specified on page 37 of the above-described reference 2 is used.

If in step S41, a manual mode is selected, the irreducibility test unit 35 performs an irreducibility test for an optimal normal basis of the designated polynomial F(x) (step S47) and checks whether the designated polynomial is a true irreducible polynomial for an optimal normal basis (step S48).

An irreducibility test for an optimal normal basis is performed, for example, by combining a test algorithm for judging whether there is an optimal normal basis, as specified on page 20 of the above-described reference 2, and the generation algorithm for generating an irreducible polynomial for an optimal normal basis.

In this case, the irreducibility test unit 35 first checks whether there is an optimal normal basis in the extension degree m of the designated polynomial F(x). If there is an optimal normal basis there, the irreducibility test unit 35 generates an irreducible polynomial for an optimal normal basis of degree m and compares F(x) with the generated polynomial. If both F(x) and the generated polynomial match, F(x) is judged to be the irreducible polynomial for an optimal normal basis.

Alternatively, a table of all irreducible polynomials for an optimal normal basis within the support range can be generated in advance based on these algorithms, and an irreducibility test for an optimal normal basis can be performed with reference to the table.

If the designated polynomial F(x) is an irreducible polynomial for an optimal normal basis, the designated polynomial F(x) is adopted as expression data, the expression data as well as the extension degree m are set in the irreducible polynomial storage area 36 (step S46) and the process is terminated. If the designated polynomial F(x) is not an irreducible polynomial for an optimal normal basis, a warning is issued via the manual data designation interface 13, and a user is urged to input a correct irreducible polynomial for an optimal normal basis again (step S49) and the processes in steps S47 and after are repeated.

If the extension degree m and irreducible polynomial for an optimal normal basis F(x) are set in the irreducible polynomial storage area 36, the finite field operation apparatus 18 performs a finite field operation in a finite field GF($2^m$) based on the data.

According to such a configuration, an irreducible polynomial for an optimal normal basis of degree m F(x) can be automatically generated only if a user designates only an extension degree m with an optimal normal basis. Therefore, a user load in designating an irreducible polynomial for an optimal normal basis F(x) can be reduced and simultaneously a high-speed finite field operation based on an optimal normal basis can be realized. The user can also directly designate an irreducible polynomial for an optimal normal basis, if required, and the flexible operability can be realized.

Although in the preferred embodiments above, the expression data generation of finite fields GF(p) and GF($2^m$) are mainly described, the same explanation applies to the expression data generation of a general finite field GF($p^m$). In this case, the data generating apparatus automatically generates the expression data of GF($p^m$) only if a user designates only a prime number p or the bit length n and an extension degree m.

Figure 14:
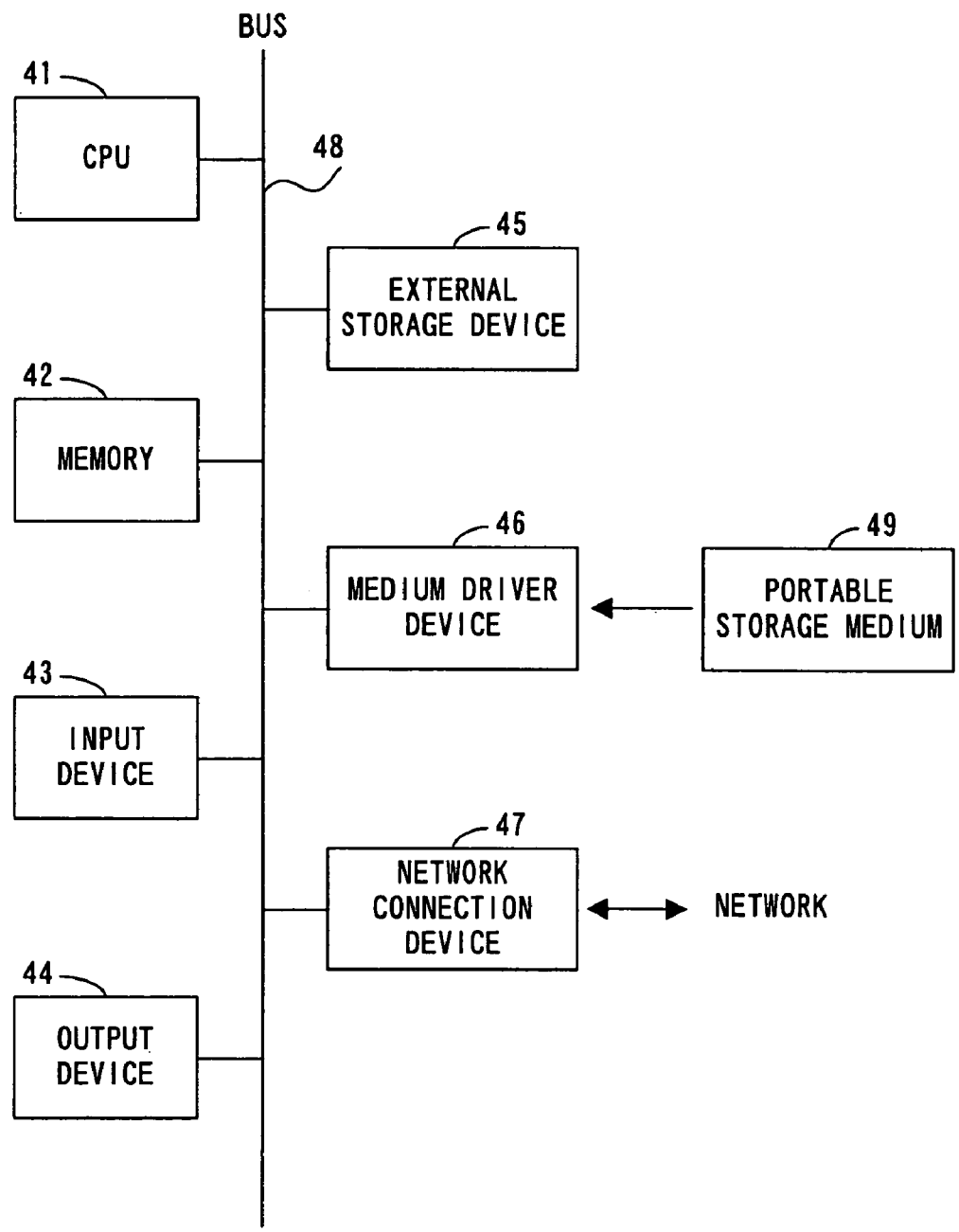
FIG. 14 shows the configuration of an information processing device.

The data generating apparatus and finite field operating apparatus in these preferred embodiments can be configured using an information processing apparatus (computer) as shown in FIG. 14. The information processing apparatus shown in FIG. 14 comprises a CPU (central processing unit) 41, a memory 42, an input device 43, an output device 44, an external storage device 45, a medium driver device 46 and a network connection device 47, which are connected with each other using a bus 48.

The memory 42 includes, for example, a ROM (read only memory), RAM (random access memory), etc., and stores a program and data used for the process. The CPU 41 performs necessary processes by running the program and using the memory 42.

In the above-described preferred embodiments, the automatic condition designation interface 12, manual data designation interface 13, expression data generator 15 and expression data verifier 16 correspond to software components embodied by an aggregate of instructions stored in the specific program segment of the memory 42. The fixed data table 14 and expression data storage area 17 shown in FIG. 4 are provided in the memory 42.

The input device 43 is, for example, a keyboard, pointing device, touch panel, etc., and is used for a user to input instructions and information. The output device 44 is, for example, a display, printer, speaker, etc., and is used to output messages and process results to a user.

The external storage device 45 is, for example, a magnetic disk device, optical disk device, magneto-optical disk device, etc. The above-described program and data can be stored in the information processing apparatus, and can be used by downloading the program and data to the memory 42, if required.

The medium driver device 46 drives a portable storage medium 49 and accesses the recorded content. For the portable storage medium 49, an arbitrary computer-readable storage medium, such as a memory card, floppy disk, CD-ROM (compact disk read only memory), optical disk, magneto-optical disk, etc., is used. A user can store the above-described program and data in this portable storage medium 49, and can use the above-described program and data by downloading them to the memory 42, if required.

The network connection device 47 communicates with an external device via an arbitrary network (line), and transmits/receives data accompanying the communications. The information processing apparatus can receive the above-described program and data from an external device via the network connection device 47, and can use the above-described program and data by downloading them to the memory 42.

Figure 15:
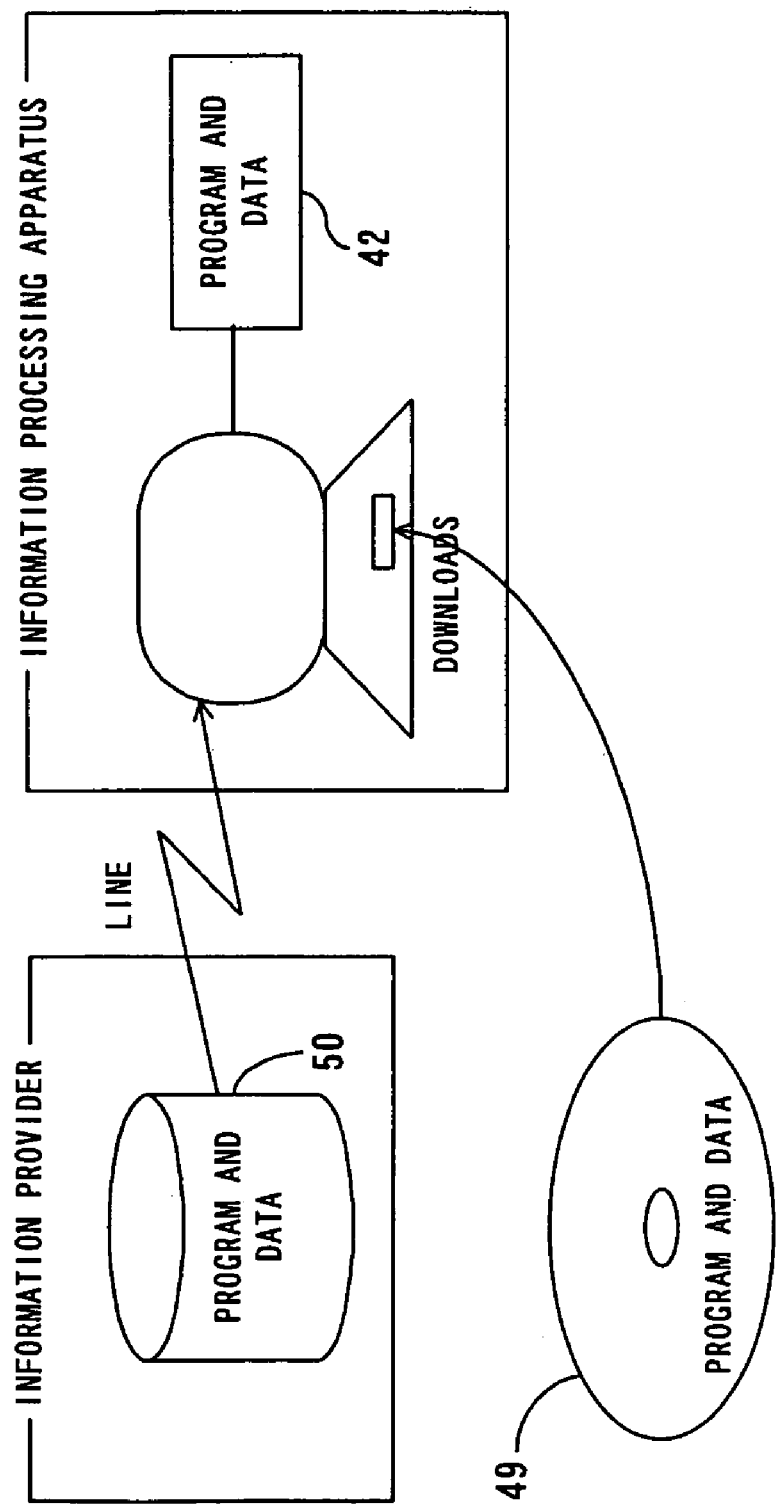
FIG. 15 shows examples of storage media.

FIG. 15 shows examples of computer-readable portable storage media for supplying a program and data to the information processing apparatus shown in FIG. 14. The program and data stored in the portable storage medium 49 or an external database 50 are downloaded to the memory 42. Then, the CPU 41 performs necessary processes by running the program and using the data.

According to the present invention, the expression data of a finite field can be automatically generated only if a user designates the minimum conditions. Therefore, a user load can be greatly reduced. A high-speed finite field operation can be realized by selectively generating specific expression data. Furthermore, in a finite field operation a user can flexibly designate all expression data according to a variety of situations.

What is claimed is:

1. A data generating apparatus, comprising:
an input device inputting a condition specified by a user for designating a finite field corresponding to a mathematical finite aggregate in which four arithmetical operations are defined, a number of elements of the finite aggregate being expressed as $p^m$ with p and m as a prime number and a positive integer indicating an extension degree, respectively;
a generation device generating a plurality of random numbers based on the inputted condition, generating a plurality of candidates for expression data of the finite field by using the generated random numbers, and checking whether each of the candidates applies to the expression data of the finite field; and
an expression data storage device storing candidates which apply to the expression data of the finite field.

2. The data generating apparatus according to claim 1, further comprising an operation device performing a finite field operation based on the expression data stored in said expression data storage device.

3. The data generating apparatus according to claim 1, wherein when a bit length of the prime number is inputted as the condition, said generation device automatically generates prime number data corresponding to the bit length and stores the generated prime number data in said expression data storage device.

4. The data generating apparatus according to claim 1, wherein when the extension degree is inputted as the condition, said generation device automatically generates irreducible polynomial data corresponding to the extension degree and stores the irreducible polynomial data in said expression data storage device.

5. The data generating apparatus according to claim 4, wherein when an instruction using an optimal normal basis is inputted, said generation device automatically generates irreducible polynomial data for an optimal normal basis corresponding to the extension degree and stores the irreducible polynomial data for an optimal normal basis in said expression data storage device.

6. The data generating apparatus according to claim 1, further comprising a fixed data storage device storing one or more pieces of predetermined expression data of a finite field, said generation device stores expression data of a finite field corresponding to the condition in said expression data storage device if there is the expression data of a finite field corresponding to the condition in the fixed data storage device, and said generation device automatically generates expression data of a finite field corresponding to the condition if there is no expression data of a finite field corresponding to the condition in the fixed data storage device.

7. The data generating apparatus according to claim 1, further comprising:

a designation device designating expression data of a finite field; and a verifier device verifying whether the designated expression data are suitable, the verifier device storing designated expression data in said expression data storage device if the designated expression data are suitable, and the verifier device asks the designation device for other expression data if the designated expression data are not suitable.

8. A computer-readable storage medium on which is recorded a program enabling a computer to execute a process, said process comprising:

specifying a condition designating a finite field corresponding to a mathematical finite aggregate in which four arithmetical operations are defined, a number of elements of the finite aggregate being expressed as $p^m$ with p and m as a prime number and a positive integer indicating an extension degree, respectively;

generating a plurality of random numbers based on the specified condition;

generating a plurality of candidates for expression data of the finite field by using the generated random numbers;

checking whether each of the candidates applies to the expression data of the finite field; and outputting the candidates which apply to the expression data of the finite field.

9. A data generating method, comprising:

designating a condition for designating a finite field corresponding to a mathematical finite aggregate in which four arithmetical operations are defined, a number of elements of the finite aggregate being expressed as $p^m$ with p and m as a prime number and a positive integer indicating an extension degree, respectively;

generating a plurality of random numbers based on the inputted condition;

generating a plurality of candidates for expression data of the finite field by using the generated random numbers;

checking whether each of the candidates applies to the expression data of the finite field; and supplying the candidates which apply to the expression data of the finite field to a finite field operation apparatus.

10. A data generating apparatus, comprising:

inputting means for inputting a condition for designating a finite field corresponding to a mathematical finite aggregate in which four arithmetical operations are defined, a number of elements of the finite aggregate being expressed as $p^m$ with p and m as a prime number and a positive integer indicating an extension degree, respectively;

generating means for generating a plurality of random numbers based on the inputted condition;

generating means for generating a plurality of candidates for expression data of the finite field by using the random numbers;

checking means for checking whether each of the candidates applies to the expression data of the finite field; and expression data storing means for storing candidates which apply to the expression data of the finite field.

* * * * *